H. C. Shafer.
Corn Planter.
N° 91,489.   Patented Jun. 15, 1869.
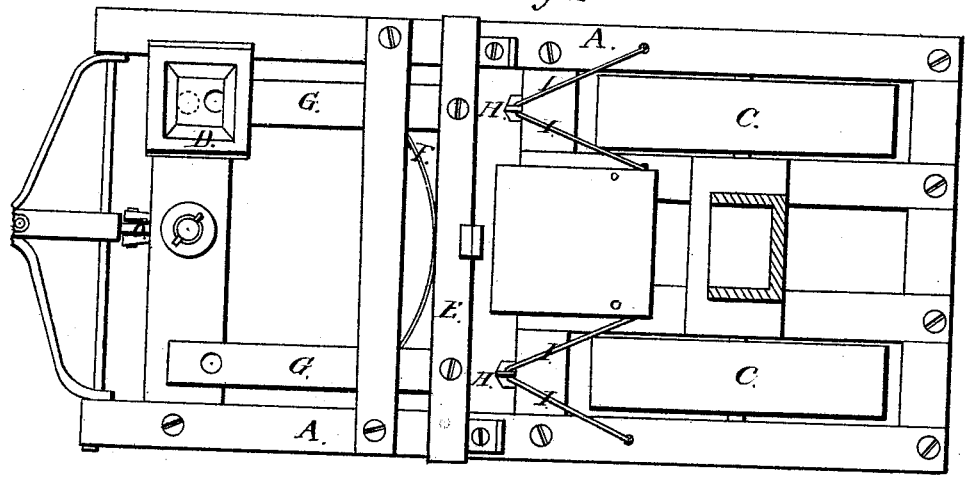
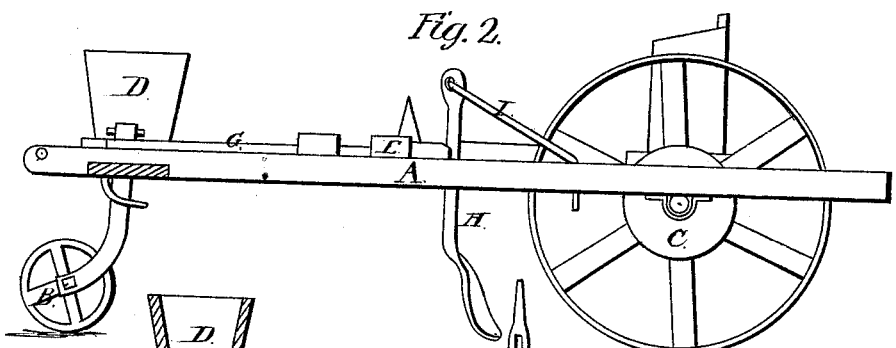
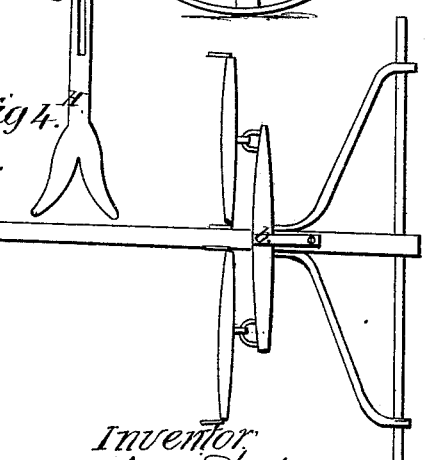
Witnesses:
Cornelius Coy
Leopold Everl
Inventor:
H. C. Shafer
per Alexander & Mason
Attys.

United States Patent Office.

HENRY C. SHAFER, OF PETERSBURG, INDIANA.

Letters Patent No. 91,489, dated June 15, 1869.

IMPROVEMENT IN CORN-PLANTERS.

The Schedule referred to in these Letters Patent and making part of the same.

*To all whom it may concern:*

Be it known that I, HENRY C. SHAFER, of Petersburg, in the county of Pike, and in the State of Indiana, have invented new and useful Improvements in Corn-Planters; and do hereby declare that the following is a full, clear, and exact description thereof, reference being had to the accompanying drawings, and to the letters of reference marked thereon.

The object of my invention is to arrange certain devices in such a manner as to form a corn-planter which will drop the grains, and then cover them, and in so arranging the slides that they are to be operated by the driver's foot alone.

Figure 1 represents a plain vew of my planter.
Figure 2 is a side elevation of the same.
Figure 3 is a section view of one of the seed-boxes.
Figure 4 is a front view of one of the scrapers.
Figure 5 is a plan view of the tongue.

Letter A represents the frame of my machine, which is supported in front upon the small ground-wheel B, and in the rear by two large driving-wheels C. As the rear ones are placed on a line with the seed-boxes and scrapers, and are intended to press the grains into the ground, their rims should be flat and broad. Instead of the axle upon which they revolve extending across the frame, it is only long enough to extend from the side of the frame to the two cross-pieces extending parallel with the wheels.

Upon each side of the front end, there is placed a grain-box, D, which boxes are of the ordinary construction, and have a small bent rod placed under the frame, extending back over the hole through which the grain drops.

If it is desired, spouts can be used to conduct the grain downward; but this is unnecessary.

Extending across the frame, in front of where the driver sits, and provided with a projecting pedal, is the lever E, by means of which the slides are operated.

Attached to the front of this lever is a spring, F, which throws the lever back to its first position as soon as the pressure from the foot is removed.

To each end of the lever there is attached one of the slides G, the holes in their ends being just sufficiently large to drop three grains to each hill.

Attached to the cross-piece, just behind the lever, there are two slotted scrapers H, which follow after the seed-boxes, so as to cover the grains. The scrapers have a slot cut in their sides, so that they can be raised or lowered, so as to suit the ground, and have braces passed through their tops, so as to strengthen them.

In using this machine it is unnecessary to list the corn-ground both ways, as the track of the machine serves as a guide to the driver.

Having thus described my invention,
What I claim, and desire to secure by Letters Patent, is—

The arrangement of the frame A, wheels B and C C, seed-boxes D, lever E, spring F, slides G G, and slotted scrapers H, all substantially as specified.

In testimony that I claim the foregoing, I have hereunto set my hand, this 21st day of March, 1869.

HENRY C. SHAFER.

Witnesses:
E. F. LITTLEPAGE,
J. W. BURTON.